US006021321A

United States Patent [19]

Kawashima

[11] Patent Number: 6,021,321

[45] Date of Patent: Feb. 1, 2000

[54] SELECTIVELY CALLED WIRELESS RECEIVER WITH PLURAL CHARACTER SET STORAGE UNIT

[75] Inventor: Shinichi Kawashima, Shizuoka, Japan

[73] Assignee: NEC Corporation, Tokyo, Japan

[21] Appl. No.: 08/908,518

[22] Filed: Aug. 7, 1997

[30] Foreign Application Priority Data

Aug. 19, 1996 [JP] Japan .................................... 8-217537

[51] Int. Cl.[7] ........................................................ H04B 1/18

[52] U.S. Cl. ..................... 455/186.1; 455/38.1; 455/228; 340/825.44

[58] Field of Search ................................. 455/38.4, 31.2, 455/31.1, 38.1, 412, 414, 403, 550, 575, 426, 552, 553, 186.1, 228; 340/825.44, 311.1, 825.27, 825.3

[56] References Cited

U.S. PATENT DOCUMENTS

| | | | |
|---|---|---|---|
| 4,873,519 | 10/1989 | Matai et al. | 340/825.44 |
| 5,193,214 | 3/1993 | Mardus et al. | 455/186.1 |
| 5,374,925 | 12/1994 | Ohkuma | 340/825.44 |
| 5,379,031 | 1/1995 | Mondrosch et al. | 455/38.1 |
| 5,426,422 | 6/1995 | Vanden Heuvel et al. | 340/825.44 |
| 5,705,995 | 1/1998 | Laflin et al. | 340/825.44 |

FOREIGN PATENT DOCUMENTS

| | | |
|---|---|---|
| 60-74736 | 4/1985 | Japan . |
| 1-282778 | 11/1989 | Japan . |
| 2-243027 | 9/1990 | Japan . |
| 3-6347 | 1/1991 | Japan . |
| 6-37701 | 2/1994 | Japan . |

*Primary Examiner*—William G. Trost
*Assistant Examiner*—Tracy M. Legree
*Attorney, Agent, or Firm*—Young & Thompson

[57] ABSTRACT

A wireless unit of a selectively called wireless receiver receives a wireless signal so as to decode the received wireless signal containing a selectively calling signal having a calling number, a vector signal containing vector type information used to define a sort of a message, and a message signal containing the message. A storage unit has a plurality of storage areas, each of the storage areas is constituted by a plurality of sectors and sector sizes of the storage areas is different from each other. When the signal decoded by the wireless unit involves an own calling number, if a control unit judges that the received message is a free statement message by referring to the vector type information, then this control unit stores this message into the storage area constituted by the large size of the sector. If the control unit judges that the received message is a numeral message by referring to the vector type information, this control unit stores this message into the storage area constituted by the small size of the sector.

15 Claims, 4 Drawing Sheets

SELECTIVELY CALLED WIRELESS RECEIVER WITH PLURAL CHARACTER SET STORAGE UNIT

BACKGROUND OF THE INVENTION

1. Field of the Invention

The present invention generally relates to a selectively called wireless receiver capable of receiving any of free statement messages and numeral messages. More specifically, the present invention is directed to such a selectively called wireless receiver capable of effectively storing message data in a message memory.

2. Description of the Related Art

Very recently, various selectively called wireless receivers called as "pocket bells" in Japan are commercially available. In this type of selectively called wireless receiver, the sector system capable of effectively storing messages has been employed as the received message management system.

One typical sector system of the selectively called wireless receiver is disclosed in, for instance, Japanese Laid-open Patent Application No. 60-74736 opened in 1985, and Japanese Laid-open Patent Application No. 2-243027 opened in 1990 as its divisional patent application. In this disclosed sector system, the message memory used to store the received message is theoretically subdivided in such a storage unit called as a "sector". Then, the received messages are sequentially stored in the storage area constituted by a set of these sectors. Then, the messages are deleted, saved, and protected in the unit of this sector.

Specifically, in a selectively called wireless receiver capable of receiving free statement messages, the sector system is employed by a message memory in order to increase the storage efficiency for the received free statement messages.

However, in an actual case, a free statement message containing a KANJI character is not always sent to this type of selectively called wireless receiver, but sometimes a short numeral message is sent thereto.

In an usual case, the sector size of the message memory employed in this type of selectively called wireless receiver is set to be equal to ½ to ⅛ of the maximum length of the message which will be received. As a result, in the case that the numeral message is received, since one sector is occupied only by the message constructed of several characters, the use efficiency of the message memory is lowered.

To avoid this drawback, it is conceivable to introduce such a method that the sector size of the message memory is reduced so as to improve the use efficiency of the message memory. However, when one long free statement message is received by this method, since a total number of sectors occupied by one message is increased, cumbersome message management is necessarily required.

On the other hand, disk apparatuses have been widely known as the apparatus with employment of the sector system. For instance, Japanese Laid-open Patent Application No. 1-282778 opened in 1989 (entitled "STORAGE MANAGING SYSTEM OF OPTICAL DISK") discloses such a technique that the sector length of the directory storage region is set to be shorter than the sector length of the data storage region in order to increase the storage efficiency. However, the information stored in the directory storage region is not equal to the data saved in the data file, but is equal to the file name used to identify the data file, the retrieve information required to retrieve the data file, and the sector numbers (sector addresses) of the plural sectors for storing the data files, and the like. As a consequence, this conventional storage managing system could not effectively store the data itself contained in the data file.

SUMMARY OF THE INVENTION

Therefore, the present invention has an object to provide a selectively called wireless receiver capable of storing a message in a message memory in a high efficiency.

To achieve the above-described object, a selectively called wireless receiver, according to the present invention, is featured by comprising:

- a wireless unit for receiving a wireless signal so as to decode the received wireless signal containing a selectively calling signal having a calling number, a vector signal containing vector type information used to define a sort of a message, and a message signal containing the message;
- a storage unit having a plurality of storage areas, each of the storage areas being constituted by a plurality of sectors and sector sizes of the storage areas being different from each other; and
- a control unit, when the signal decoded by the wireless unit involves an own calling number, for storing the message contained in the decoded signal into the storage area corresponding to the vector type information contained in the decoded signal.

In accordance with this invention, the storage unit is constituted by a storage area having a sector size suitable for, e.g., a free statement message, and also by another storage area having another sector size suitable for a numeral message. Then, the received free statement message is stored into the storage area having the large sector size, whereas the numeral message is stored into the storage area having the small sector size. As a result, the received messages can be more effectively stored in the message memory.

BRIEF DESCRIPTION OF THE DRAWINGS

A more complete understanding of the teachings of the present invention may be acquired by referring to the accompanying figures, in which like reference numbers indicate like features and wherein.

DESCRIPTION OF THE PREFERRED EMBODIMENTS

Figure 1A:
FIGS. 1A through 1D represent a structure of a reception signal applied to a selectively called wireless receiver according to an embodiment of the present invention.

Referring now to drawings, a selectively called wireless receiver according to an embodiment of the present invention will be described. FIG. 1A to FIG. 1D schematically shows a structure of a reception signal applied to this selectively called wireless receiver. In FIG. 1A, symbol "P" denotes a preamble signal used to establish a bit synchronization, symbol "F" shows a frame sync (synchronization) signal, symbol "AF" represents a selectively calling signal group, symbol "VF" indicates a vector signal group, and symbol "MF" represents a message signal group.

In this case, the vector signal group "VF" corresponds to the selectively calling signal group "AF" in a one-to-one correspondence relationship. Based on a message starting word number (B6 to B0) and a message word quantity (N6 to N0), a message signal position related to a calling number is designated in a vector manner. Also, based on a vector type (V2 to V0), a sort of this message signal is designated.

It should be noted in this embodiment that the following judgments are made as follows: When the vector type is "001", this message signal is a numeral/KATAKANA-character message. When the vector type is "010", this message signal is a free statement message. The message signal group MF contains such message signals having message words, the quantity of which is designated by the vector signal group VF.

Figure 1B:
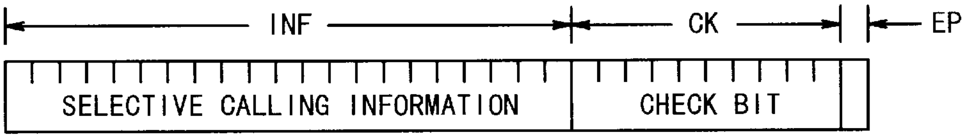
Figure 1C:
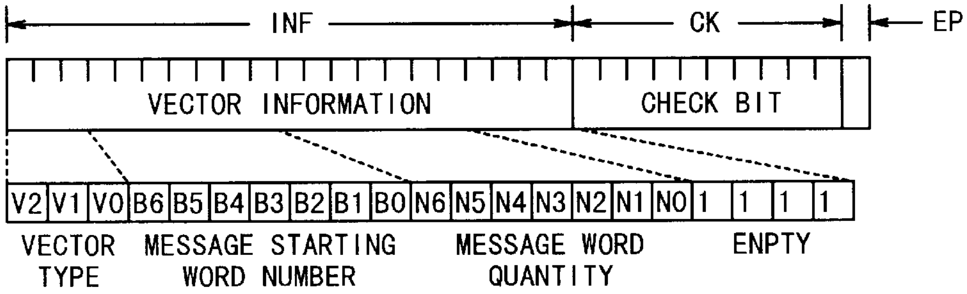
Figure 1D:
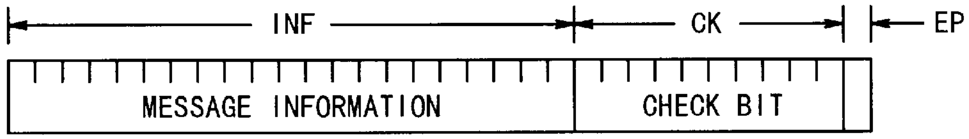

FIG. 1B indicates one example of the selectively calling signal group AF containing selectively calling information, namely such a signal produced by adding a parity bit to BCH (Bose Chaudhuri Hocquenghem) codes (31, 21). Similarly, FIG. 1C shows an example of the vector signal group VF containing vector information. FIG. 1D indicates an example of the message signal group MF containing message information.

Each of these signal groups is constituted by one or more words. Each of the words is arranged by 32 bits, in which contains a 21-bit information bit area "INF", a 10-bit check bit area "CK", and a 1-bit even parity "EP".

As the message information of the message signal group shown in FIG. 1D, either a character set of a 4-bit BCD (Binary Coded Decimal) code or a character set of a 16-bit shift JIS (Japanese Industrial Standard) code. A KANJI character is expressed by the shift JIS code.

Figure 2:
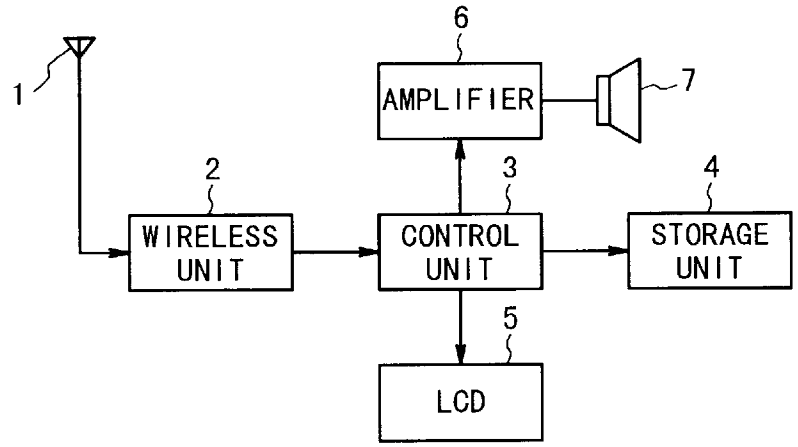
FIG. 2 is a schematic block diagram for showing an arrangement of the selectively called wireless receiver according to the embodiment of the present invention.

FIG. 2 is a schematic block diagram for indicating an arrangement of a selectively called wireless receiver according to an embodiment of the present invention. In FIG. 2, a wireless (radio) signal received by an antenna 1 is amplified and demodulated by a wireless unit 2.

Subsequently, the selectively calling information contained in the demodulated selectively calling signal is compared with an own calling number in a control unit 2. As a result of this comparison, when it is so judged that the selectively calling information is made coincident with the own calling number, vector information corresponding to this selectively calling information is analyzed, and then a message is acquired based upon this analysis result.

Thereafter, this message is stored in a file format into a storage unit 4, and also is supplied to an LCD (Liquid Crystal Display) 5. Accordingly, visible information is displayed on the LCD 5. Also, to notify a call, the control unit 3 outputs a buzzer signal to an amplifier 6. As a result, a loudspeaker 7 is driven in response to this buzzer signal.

Figure 3:
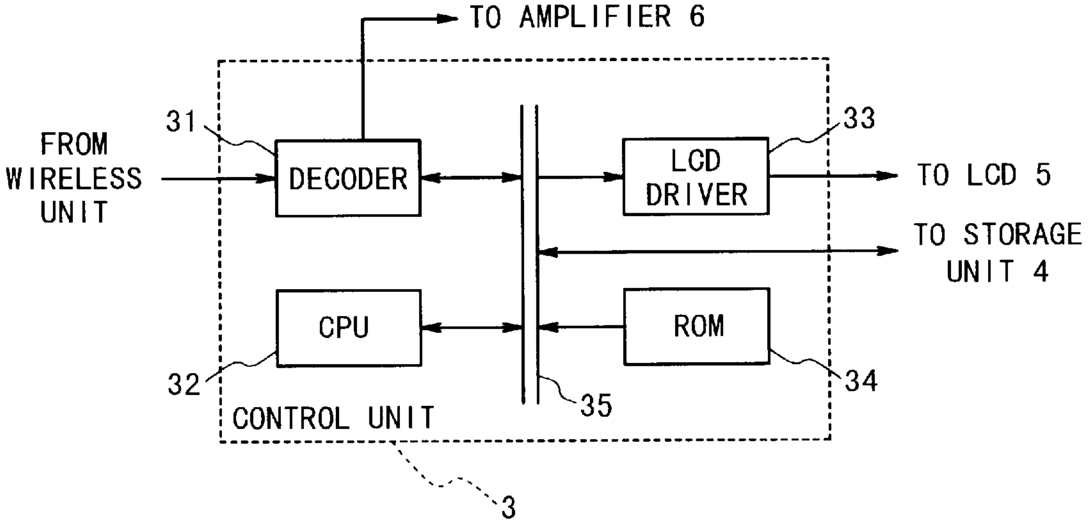
FIG. 3 is a schematic block diagram for indicating a detailed internal arrangement of a control unit 3 shown in FIG. 2.

FIG. 3 is a schematic block diagram for showing a detailed internal arrangement of the control unit 3 shown in FIG. 2. As shown in FIG. 3, the control unit 3 is composed of a decoder 31, a CPU (Central Processing Unit) 32, an LCD driver 33, and a ROM (Read-Only Memory) 34 used as a program memory. These internal circuit elements are mutually connected via a bus 35.

The decoder 31 derives the message information from the message signal based upon the vector information in such a case that the own calling number is made coincident with the selectively calling information contained in the demodulated selectively calling signal, and also notifies this coincident information to the CPU 32.

The CPU 32 reads both the vector type and the message information, corresponding to a portion of the vector information, from the decoder 31, and transfers the read vector type/message information in the file format to a storage unit 4 (see FIG. 2) so as to be stored therein. At the same time, the CPU 32 transfers display data produced by converting the message information to the LCD driver 33. As a result, the message is displayed on the LCD 5. A series of the above-described sequential operation is previously written as a program into the ROM 34 functioning as a program memory.

Figure 4:
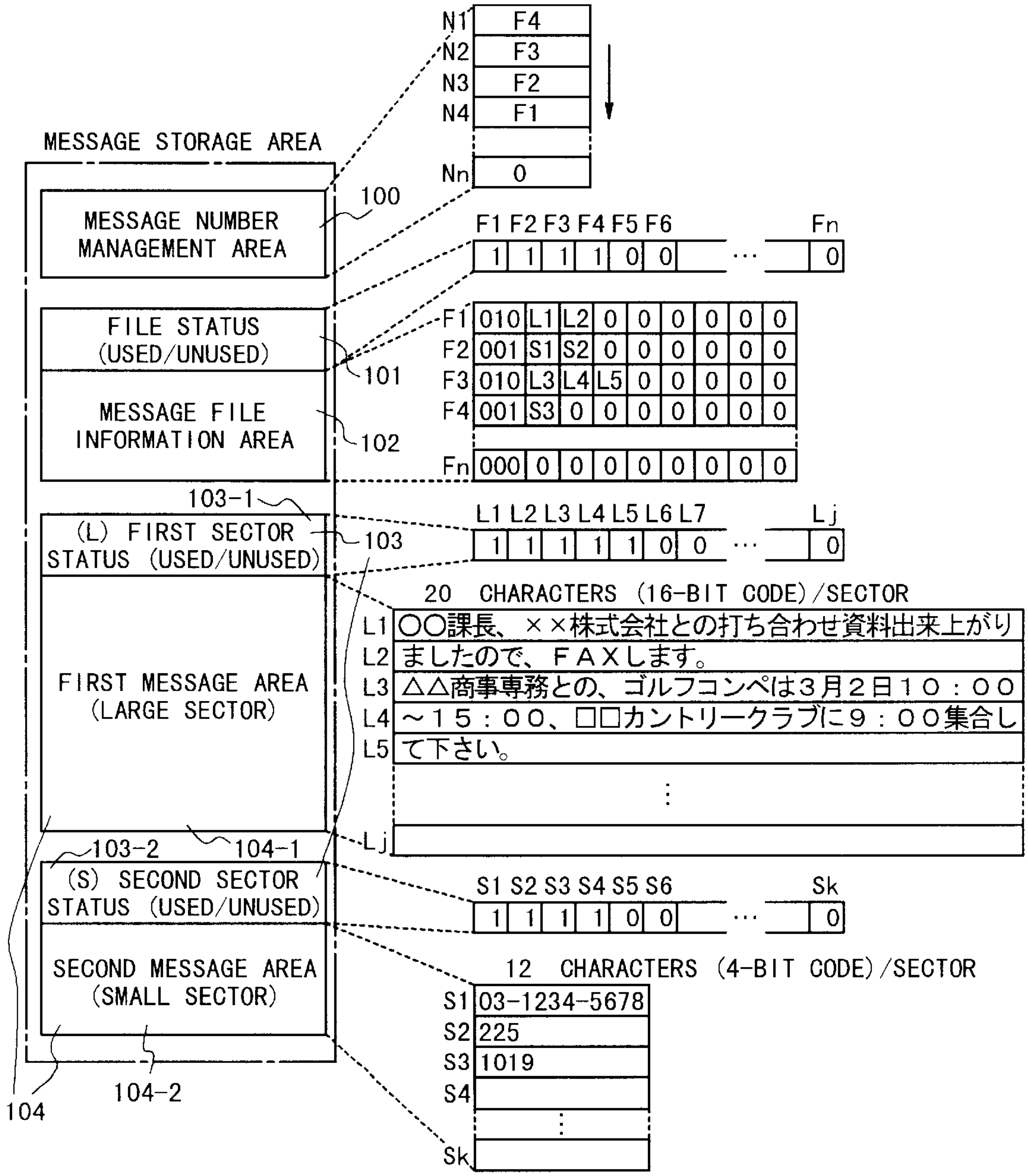
FIG. 4 illustratively represents a structure of data handled in the selectively called wireless receiver according to the embodiment of the present invention.

FIG. 4 indicates a structure of a message storage area formed in the storage unit 4. This message storage area is constructed of a message number management area 100, a file status area 101, a message file information area 102, a sector status area 103 a message area 104.

The message area 104 is subdivided into a first message area 104-1 used to store a free statement message, and a second message area 104-2 used to store a numeral/KANA-character message. A size of a sector of the first message area 104-1 is designed by that 25 pieces of characters formed by 16 bits codes can be stored. This first message area 104-1 contains "j" pieces of sectors which are designated by sector numbers L1, L2, - - - , Lj. A size of a sector of the second message area 104-2 is designed by that 12 pieces of characters formed by 4 bits codes can be stored. This second message area 104-2 contains "k" pieces of sectors which are designated by sector numbers S1, S2, - - - , Sk.

Also, the sector status area 103 is subdivided into a first sector status area 103-1 corresponding to the first message area 104-1, and a second sector status area 103-2 corresponding to the second message area 104-2. The first sector status area 103-1 stores therein use conditions of the respective sectors of the first message area 104-1. "0" is stored in an unused sector, whereas "1" is stored in a used sector. As a consequence, in the case that a free statement message is newly allocated to a sector in the first message area 104-1, this first sector status area 103-1 is referred, so that an empty sector contained in the first message area 104-1 can be sought.

Similarly, the second sector status area 103-2 stores therein use conditions of the respective sectors of the second message area 104-2. "0" is stored in an unused sector, whereas "1" is stored in a used sector. As a consequence, in such a case that a numeral/KANA-character message is newly allocated to a sector in the second message area 104-2, this second sector status area 103-2 is referred, so that an empty sector contained in the second message area 104-2 can be sought.

The message number management area 100 contains "n" pieces of entries N1, N2, - - - , Nn. The respective entries store therein numbers F1, F2, - - - , Fn of message files. The historical data about the received message can be recognized by the storage sequence of the message file numbers in the message number management area 100.

It should be understood that all of initial values of the respective entries N1, N2, - - - , Nn are "0", and indicate that none of the message file numbers is stored under this condition. For instance, when a message file formed by receiving a message signal is assigned to the number F3, after the contents of the respective entries are shifted along an arrow direction of FIG. 4, "F3" is stored in an empty entry N1.

The message file information area 102 contains "n" pieces of entries F1, F2, - - - , Fn. The respective entries of the message file information area 102 correspond to the numbers of the message files. Both a sort of the message file and a sector number of a first or second message area 104-2 into which this message file is stored are saved in each of these entries.

The file status area 101 stores use conditions of the message file information area 102. When the entry of the message file information area 102 is unused, "0" is stored, whereas when the entry of the message file information area 102 is used, "1" is stored. As a result, when the message file is newly stored, this file status area 101 is referred, so that an empty entry can be sought.

In FIG. 4, there is shown such an example that 25 characters (16-bit code) are stored in the each sector of the first message area 104-1 corresponding to the free statement message, and 12 characters (4-bit code) are stored in the each sector of the second message area 104-2 corresponding to the numeral/KANA-character message.

Within the first message area 104-1 and second message area 104-2, the message information is stored in a sequential manner. For example, the message file having the number F1 occupies 2 sectors L1 and L2. In this case, the message information implies "○○ ×× FAX". Note that this sentence implies in Japanese "To section manager "○○", since meeting memorandum with reference to "××" K.K. is prepared, I will send it via a facsimile line.". Similarly, the message file having the number F3 occupies 3 sectors L3, L4 and L5.

Figure 5:
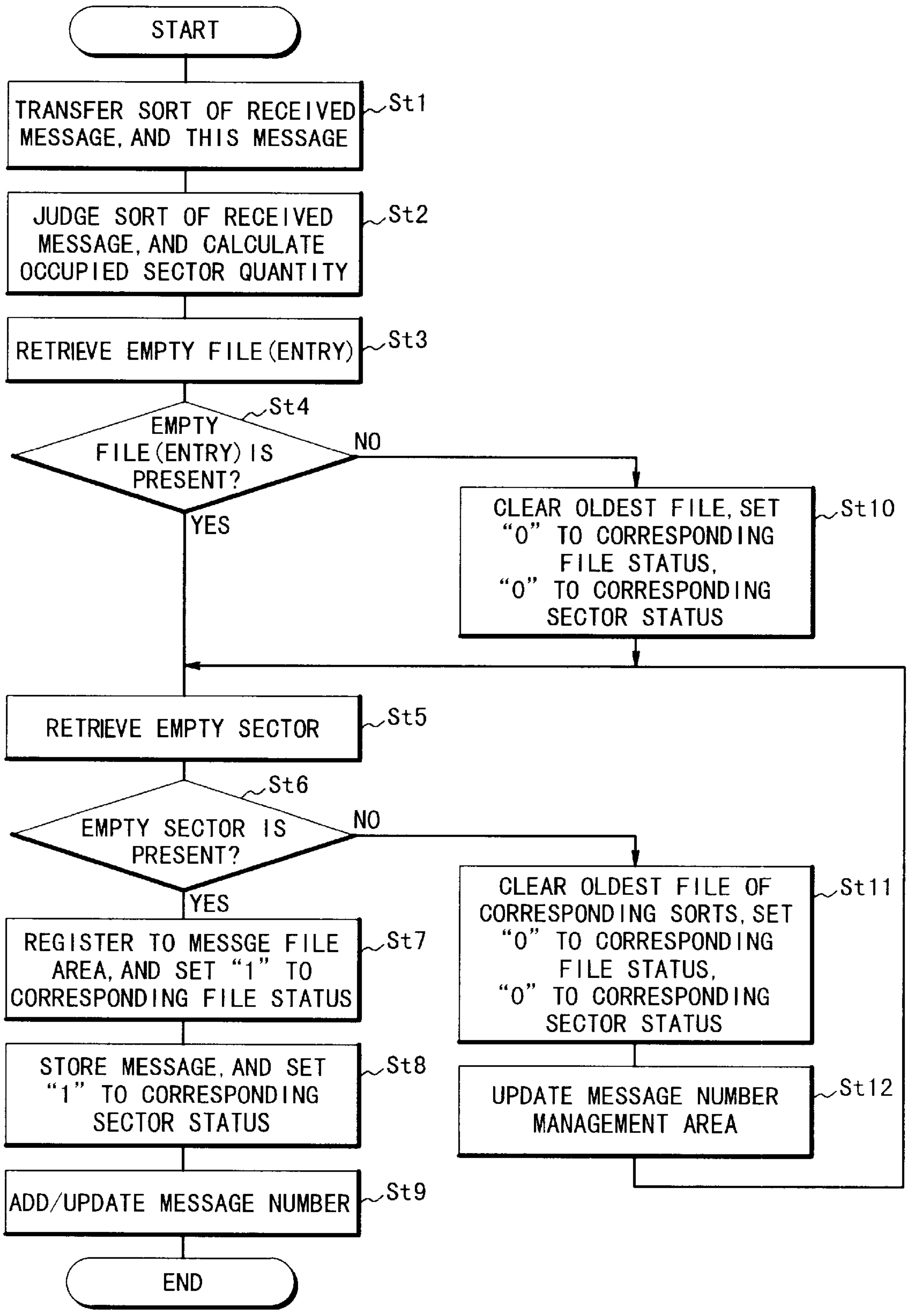
FIG. 5 is a flow chart for describing a process sequence executed in the selectively called receiver according to the embodiment of the present invention.

FIG. 5 is a flow chart for describing a process operation of the selectively called wireless receiver according to this embodiment. At a first step St1, both the sort of the received message (i.e., type of message) and the received message itself are transferred to the buffer area within the storage unit 4.

At a next step St2, a check is made as to the sort of the received message transferred to the buffer area within the storage unit 4 at the above step St1. In this case, if the vector type of the received message is "001", then the CPU 32 judges that this received message corresponds to the numeral message, and then the message data length is divided by 12 characters (4-bit code) to thereby calculate the occupied sector quantity number.

On the other hand, when the vector type of the received message is "010" at the step St2, the CPU 32 judges that this received message corresponds to the free statement message, and then the message data length is divided by 25 characters (16-bit code) to thereby calculate the occupied sector number.

At a step St3 and a step St4, a check is done as to whether or not an empty entry is present in the message file information area 102 with reference to a file status area 101 (see FIG. 4). Then, when the empty entry is present, this empty entry is secured, and the process operation is advanced to a step St5. To the contrary, when there is no empty entry, the process operation is advanced to a step St10.

At the step St5 and a step St6, another check is made as to whether or not an empty sector corresponding to the occupied sector number calculated at the previous step St2 is present with reference to any of the first sector status area 103-1 and the second sector status area 103-2, depending upon the sort of the received message. Then, when the empty sector is present, this empty sector is secured, and then the process operation is advanced to a step St7. To the contrary, when there is no such an empty sector, the process operation is advanced to a step St13.

At the step St7, both the information indicative of the sort of the message and the sector number of the sector secured at the above-described step St5 are written into the entry secured at the previous step St3 within the message file information area 102. Thereafter, "1" is set to a position of the file status area 101, which corresponds to this entry.

At a further step St8, the received message is stored into the sector secured at the above-described step St5. Also, "1" is set to a position of the first sector status area 103-1 or second sector status area 103-2, which corresponds to this sector. At a next step St9, the number of the message file of the entry acquired at the step St3 is added to the message number management area 100.

At the above-described step St10, the oldest message file (namely, message file stored in the first place) is deleted. Concretely speaking, the number of this relevant message file stored in the message number management area 100 is cleared, the entry corresponding to this number within the message file information area 102 is cleared, and also the file status area 101 corresponding to this entry is set to "0". Furthermore, the content of the sector designated by this entry is cleared, and also either the first sector status area 103-1 or the second sector status area 103-2 corresponding to this sector is set to "0". Thereafter, the process operation is advanced to the above-described process operation defined at the step St5.

At the above-explained step St11, the oldest message file among such messages having the same sort as that of messages that will be stored is erased. Concretely speaking, the number of the relevant message file stored in the message number management area 100 is cleared, the entry corresponding to this number within the message file information area 102 is cleared, and also the file status area 101 corresponding to this entry is set to "0". Furthermore, the content of the sector designated by this entry is cleared, and also either the first sector status area 103-1 or the second sector status area 103-2 corresponding to this sector is set to "0".

At a further step St12, the content of the message number management area 100 is updated. In other words, when there is an empty in the message number management area 100 is made by executing the process operations defined at the step St11, the message numbers are moved to cancel the empty area. Thereafter, the process operation is returned to the previous process operation defined at the step St5.

As previously described, in accordance with the present invention, the storage region owned by the storage unit is constituted by two sets of storage regions having one sector size suitable for the free statement message and the other sector size suitable for the numeral message. When the received message is stored, the free statement message is stored in the sector having the large sector size, whereas the numeral message is stored in the sector having the small sector size, depending upon the sorts of the messages. As a consequence, it is possible to realize the selectively called wireless receiver with the higher message storage efficiency.

What is claimed is:

1. A selectively called wireless receiver comprising:

a wireless unit for receiving and decoding a wireless signal containing a selectively calling signal which has a calling number, a vector signal which contains vector type information used to define a sort of a message, and a message signal which contains the message;

a storage unit having a plurality of storage areas, each of which is composed of a plurality of fixedly-sized sectors, said fixedly-sized sector sizes of said plurality of storage areas being different from each other; and a control unit, when said selectively calling signal decoded by said wireless unit contains said calling number allocated to said selectively called wireless receiver, for storing the message contained in said decoded message signal into the storage area corresponding to the vector type information contained in said decoded vector signal.

2. The selectively called wireless receiver according to claim 1, wherein said vector type information is determined based upon a sort of a character set used to form said message.

3. A selectively called wireless receiver comprising:

a wireless unit for receiving and decoding a wireless signal containing a selectively calling signal which has a calling number, a vector signal which contains vector type information used to define a sort of a message, and a message signal which contains the message;

a storage unit having a plurality of storage areas, each of which is composed of a plurality of sectors and sector sizes of said plurality of storage areas being different from each other; and a control unit, when said selectively calling signal decoded by said wireless unit contains said calling number allocated to said selectively called wireless receiver, for storing the message contained in said decoded message signal into the storage area corresponding to the vector type information contained in said decoded vector signal, wherein said vector type information is determined based upon a sort of a character set used to form said message, wherein the sort of said character set contains a first set of characters in which each of said characters of said first set is constructed of predetermined bits, and a second set of characters in which each of said characters of said second set is constructed of bits larger than said predetermined bits.

4. The selectively called wireless receiver according to claim 3, wherein said storage unit includes a first storage area constituted of a plurality of sectors having a predetermined sector size, and a second storage area constituted of a plurality of sectors having a sector size shorter than said predetermined sector size, and said control unit stores a message, which is produced by using said first set of characters, into said first storage area, and stores another message, which is produced by using said second set of characters, into said second storage area.

5. The selectively called wireless receiver according to claim 1, further comprising:

notifying means for notifying a call with sound when said selectively calling signal decoded by said wireless unit contains said calling number allocated to said selectively called wireless receiver; and display means for displaying the message contained in said decoded message signal.

6. A selectively called wireless receiver comprising:

a wireless unit for receiving and decoding a wireless signal containing a selectively calling signal which has a calling number, a vector signal which contains vector type information used to define a sort of a message, and a message signal which contains the message;

a storage unit having a plurality of storage areas, each of which is composed of a plurality of sectors and sector sizes of said plurality of storage areas being different from each other;

a sector status storage unit provided in correspondence with each of the storage areas of said message storage unit, for storing therein information as to whether or not each sector of the respective storage areas is used;

a sector number storage unit having a plurality of entries, each of which stores the number of sector for storing therein said message in said message storage unit;

a file status storing unit provided in correspondence with each of the entries of said sector number storage unit, for storing therein information as to whether or not each of said entries is used; and a control unit in which when said selectively calling signal decoded by said wireless unit contains calling number allocated to said selectively called wireless receiver, the message contained in said decoded message signal is stored in an empty sector detected by investigating the sector status storage unit corresponding to the vector type information contained in said decoded vector signal, and the number of the sector into which said message has been stored is stored into an empty entry detected by investigating said file status storage unit.

7. The selectively called wireless receiver according to claim 6, wherein said vector type information is determined based upon a sort of a character set used to form said message.

8. The selectively called wireless receiver according to claim 7, wherein the sort of said character set contains a first set of characters in which each of said characters of said first set is constructed of predetermined bits, and a second set of characters in which each of said characters of said second set is constructed of bits larger than said predetermined bits.

9. The selectively called wireless receiver according to claim 8, wherein said message storage unit includes a first storage area constituted of a plurality of sectors having a predetermined sector size, and a second storage area constituted of a plurality of sectors having a sector size shorter than said predetermined sector size, and said control unit stores a message, which is produced by using said first set of characters, into said first storage area, and stores another message, which is produced by using said second set of characters, into said second storage area.

10. The selectively called wireless receiver according to claim 6, further comprising:

notifying means for notifying a call with sound when said selectively calling signal decoded by said wireless unit contains said calling number allocated to said selectively called wireless receiver; and display means for displaying the message contained in said message signal.

11. A method for storing a message of a selectively called wireless receiver comprising the steps of:

providing a storage unit having a plurality of storage areas, each of which is composed of a plurality of fixedly-sized sectors, said fixedly-sized sector sizes of the plurality of storage areas being different from each other;

receiving and decoding a wireless signal containing a selectively calling signal which has a calling number, a vector signal which contains vector type information used to define a sort of a message, and a message signal which contains the message; and when said decoded selectively calling signal contains said calling number allocated to said selectively called wireless receiver, storing the message contained in said decoded message signal into the storage area corresponding to the vector type information contained in said decoded vector signal.

12. The message storing method of a selectively called wireless receiver according to claim 11, wherein said vector type information is determined based upon a sort of a character set used to form said message.

13. A method for storing a message of a selectively called wireless receiver comprising the steps of:

providing a storage unit having a plurality of storage areas, each of which is composed of a plurality of sectors and sector sizes of the plurality of storage areas being different from each other;

receiving and decoding a wireless signal containing a selectively calling signal which has a calling number, a vector signal which contains vector type information used to define a sort of a message, and a message signal which contains the message; and when said decoded selectively calling signal contains said calling number allocated to said selectively called wireless receiver, storing the message contained in said decoded message signal into the storage area corresponding to the vector type information contained in said decoded vector signal, wherein said vector type information is determined based upon a sort of a character set used to form said message, wherein the sort of said character set contains a first set of characters in which each of said characters of said first set is constructed of predetermined bits, and a second set of characters in which each of said characters of said second set is constructed of bits larger than said predetermined bits.

14. The message storing method of a selectively called wireless receiver according to claim 13, wherein said storage unit includes a first storage area constituted of a plurality of sectors having a predetermined sector size, and a second storage area constituted of a plurality of sectors having a sector size shorter than said predetermined sector size, and wherein said storing step includes;

when said vector type information indicate a first type message which is produced using said first set of characters, storing said first type message into said first storage area, and when said vector type information indicate a second type message which is produced by using said second set of characters, storing said second type message into said second storage area.

15. The message storing method of a selectively called wireless receiver according to claim 11, further comprising the steps of:

notifying a call with sound when said decoded selectively calling signal contains the said calling number allocated to said selectively called wireless receiver; and displaying the message contained in said decoded message signal.

* * * * *